United States Patent [19]

Fortin et al.

[11] Patent Number: 5,037,707

[45] Date of Patent: Aug. 6, 1991

[54] ALUMINUM PRODUCTS HAVING IMPROVED CORROSION RESISTANCE

[75] Inventors: Paul E. Fortin; Pierre H. Marois; Dewi G. S. Evans, all of Kingston, Canada

[73] Assignee: Alcan International Limited, Montreal, Canada

[21] Appl. No.: 302,021

[22] Filed: Jan. 25, 1989

[30] Foreign Application Priority Data

Feb. 3, 1988 [CA] Canada .................. 558078

[51] Int. Cl.$^5$ ...................... B32B 15/10; C21D 1/00
[52] U.S. Cl. ........................... 428/654; 148/11.5 A; 148/11.5 Q; 148/127
[58] Field of Search ............. 148/2, 11.5 A, 11.5 Q, 148/127; 428/610, 654

[56] References Cited

U.S. PATENT DOCUMENTS

| | | | |
|---|---|---|---|
| 2,821,014 | 1/1958 | Miller | 428/654 |
| 3,788,824 | 1/1974 | Singleton, Jr. et al. | 428/654 |
| 3,994,695 | 11/1976 | Setzer et al. | 428/654 |
| 4,039,298 | 8/1977 | Anthony et al. | 428/558 |
| 4,093,782 | 6/1978 | Anthony et al. | 428/654 |
| 4,172,548 | 10/1979 | Nakamura | 228/183 |
| 4,339,510 | 7/1982 | Kaifu et al. | 428/654 |
| 4,586,964 | 5/1986 | Finnegan et al. | 148/11.5 A |
| 4,649,087 | 3/1987 | Scott et al. | 428/654 |
| 4,828,936 | 5/1989 | Toma et al. | 428/654 |

FOREIGN PATENT DOCUMENTS

| 0241125 | 10/1987 | European Pat. Off. | |
| 211056 | 10/1985 | Japan | 148/127 |

Primary Examiner—R. Dean
Assistant Examiner—Robert R. Koehler
Attorney, Agent, or Firm—Cooper & Dunham

[57] ABSTRACT

A corrosion resistant aluminum article is described. It includes a main body portion formed of an aluminum alloy containing no more than 0.4% iron, no more than 0.15% silicon, from about 0.1% to about 0.6% copper and from about 0.7% to about 1.5% manganese. The corrosion resistance is provided by a silicon-rich band of dense precipitate formed in the alloy adjacent at least one face thereof. This band has a thickness of about 20-50 μm and there is substantially less manganese in solid solution in the band than in the alloy outside the band. To form the band, a silicon-containing layer is applied to a surface of the alloy body to be protected and the composite thus formed is heat treated at a temperature of at least 550° C.

9 Claims, 1 Drawing Sheet

ALUMINUM PRODUCTS HAVING IMPROVED CORROSION RESISTANCE

BACKGROUND OF THE INVENTION

This invention relates to aluminum products, and particularly to aluminum products having improved corrosion resistance, as well as a process for making such products.

Corrosion resistance is a concern common to many aluminum components used in a variety of applications. For example, road salt and moisture often cause perforation of automotive radiators.

It has been known for many years that corrosion problems in brazing can be alleviated to some extent by adding an interlayer between the structural member portion or core and the brazing layer. Such an interlayer is described, for instance, in Miller U.S. Pat. No. 2,821,014. The problem of corrosion in vacuum brazing is particularly considered in Singleton et al U.S. Pat. No. 3,788,824, where iron is added to either the core alloy or the cladding alloy to provide corrosion resistance and sag resistance. Various other patents such as U.S. Pat. Nos. 4,039,298, 4,093,782, 3,994,695, 4,339,510 and 4,649,087 describe various combinations of alloying components particularly for the core alloy which are claimed to provide benefit in intergranular corrosion resistance.

In Nakamura, U.S. Pat. No. 4,172,548, a procedure is described for controlling corrosion following vacuum brazing by controlling the grain size of the brazing sheet to at least 60 microns in diameter, this being achieved by a controlled cold work followed by a full anneal.

Finnegan et al, U.S. Pat. No. 4,586,964 also considers the problem of corrosion in a vacuum brazed product and suggests a technique in which an interanneal is provided before a controlled cold work. This controlled cold work is maintained within a certain range of reduction.

SUMMARY OF THE INVENTION

It has now been discovered that corrosion, such as intergranular corrosion, in aluminum components can be controlled by a combination of the particular composition of the alloy material, such that it contains a certain minimum amount of manganese in solid solution and/or as finely precipitated particles, providing a silicon-rich layer on its surface and subjecting the surface coated alloy to a short heat treatment at high temperature.

The aluminum alloy material used in the product of this invention is an aluminum-based alloy containing no more than 0.4% iron, no more than 0.15% silicon, from about 0.1% to about 0.6% copper and from about 0.7% to about 1.5% manganese. Optionally, the alloy may also contain no more than 0.8% magnesium and/or from about 0.05% to about 0.25% zirconium.

This alloy may be formed by a variety of means, such as casting, extrusion, hot rolling, etc., into a preliminary, intermediate or final product. For instance, it may be a sheet or intermediate shape which may later be further formed or it may be a final product. It is important that the fabrication be conducted in a manner such as to ensure that a sufficient amount of manganese is retained in solid solution and/or in the form of precipitated particles having a size of less than 0.2 $\mu$m. Generally, this means limiting the amount of time the material is exposed to elevated temperatures, and, in any event, avoiding exposing the material to temperatures above 525° C.

A silicon-containing layer is applied to one or more surfaces of the aluminum product to be protected. This may be done by a variety of means, such as flame spraying, cladding with an aluminum-silicon alloy containing 1–15% silicon, etc.

When this aluminum alloy product with the silicon-containing surface layer is submitted to a final heat treatment of 550° C. or greater, it has been discovered that, in the alloy material immediately adjacent the silicon coating, there is formed a band of dense precipitate which appears to play a major role in improving the corrosion resistance of the heat treated product. Preferably this high temperature heat is applied for a short time, e.g. less than one hour and preferably less than 30 minutes. The band of dense precipitate corrodes preferentially to the main body of alloy and will substantially corrode away before the main alloy body is attacked. Thus, it protects the product from perforation.

It is known that in the as-cast ingot, most of the manganese is in super-saturated solid solution. It was observed that before final heat treatment, alloys of this invention exhibit a fine, uniformly distributed, dense precipitate of Mn-containing particles. For final heat treatment, the metal is brought up to about 600° C. and in most of the alloy, the smallest precipitate particles become unstable and revert to solid solution, except in a band subjacent to the silicon coating. Analysis by x-rays has shown that because silicon diffused from the coating into the alloy during the final heat treatment forming a layer with high silicon content, the manganese solid solubility was reduced markedly and this not only minimized re-dissolution of the manganese-containing particles but promoted further precipitation of manganese still in solid solution. The particles themselves in the band contain silicon but those away from the band contain little or no silicon.

Before final heat treatment, the above particles (which are often called dispersoids) are fine and numerous, having sizes in the order of 0.03 to 0.1 $\mu$m. During final heat treatment, the smaller particles dissolve and some manganese precipitates on the surviving coarser particles, increasing their size to between 0.1 and 0.4$\mu$m. In the band under the silicon coating, however, because of the silicon content, fine particles survive the heat treating temperature and some of the manganese in solid solution precipitates on the existing particles. The band of dense precipitate typically has a thickness of about 20–50 $\mu$, with a thickness of about 25–40$\mu$m being preferred.

Hereinafter, the manufacture of products in accordance with this invention will be described in terms of a sheet product on which the silicon layer is applied by cladding an aluminum-silicon alloy to its surface. Other fabrication techniques, such as extrusion, casting, etc. are possible provided the principles of the invention are followed as will be obvious to persons skilled in the art.

The as-cast alloy material is preferably heated to a temperature between 425° and 525° C. prior to hot rolling and held at this temperature for the minimum time required to ensure temperature uniformity. Preferably, the coating is applied by cladding with aluminum-silicon alloy on the manganese-containing alloy during the first stage of hot rolling. While it is preferred not to anneal the material, if annealing is required to obtain the desired mechanical properties, then the annealing temperature should be no higher than about 450° C. for a full anneal and no higher than about 350° C. for a partial anneal, and the anneal should be carried out after the material is rolled to final gauge.

The core alloy of the clad product is typically of the type of the 3XXX series of Aluminum Association designated alloys. However, it must be within the composition ranges stated above, and it is preferred that these alloys contain no more than 0.2% iron, no more than 0.1% silicon, from about 0.2% to about 0.4% copper, from about 0.2% to about 0.4% magnesium, from about 0.9% to about 1.1% manganese and optionally from about 0.1% to about 0.15% zirconium. Thus, it was found that with regular 3003 or 3005-type of core alloys containing about 0.6% iron and about 0.3% silicon, a faint band was formed in the heat treated sheet which was insufficient to provide the desired corrosion protection. On the other hand, when a purer base is used within the limits of the present invention, a definitive and effective band of dense precipitate is formed in the heat treated sheet. Particularly good results are obtained when iron is kept below 0.2% and silicon is kept below 0.1%. Even better results are obtained when silicon is kept below 0.05%. Since silicon affects the manganese solid solubility the most, when it is too high in the core alloy it is not possible to obtain a strong and effective band.

The copper is added to increase the strength as well as the nobility of the core alloy. Since the cladding does not contain copper, during annealing and final heat treatment there is copper diffusion from the band region of the core to the coating with a net effect that the dense band is impoverished in copper relative to the rest of the core and this reduces the nobility of the band, thereby augmenting the effectiveness of the band of dense precipitate.

The manganese plays a primordial role in the band formation and a high manganese content is essential. Magnesium is added for strengthening the alloy. Titanium may be added as grain refiner, but it does not contribute to the band formation. Zirconium may be added to increase sag resistance.

When the core alloy is coated on both sides with siliconcontaining material, a dense band is formed on each side and corrosion protection exists for either side. For some applications, it may be necessary to protect only one side of the product and then only the side requiring protection need be provided with a silicon-rich layer. Also, it may be desirable to provide the second side with another type of protection, such as a layer of pure aluminum.

In conventional processing routes, alloys of the AA 3XXX series are typically homogenized at high temperatures. This is normally done by heating to 550°-625° C. and soaking for several hours. This treatment is followed by either a second soak at a lower temperature or a slow cooling to a similar temperature. Furthermore, it is common practice when producing sheet products to interanneal at some stage during the fabrication of the sheet. With the alloy composition of the core and the processing route of the present invention, it has been found that both homogenization and interannealing are detrimental to the corrosion resistance of the product.

It is known that the finer the precipitate, the greater the tendency for the precipitate to dissolve during heat treatment. This in turn causes the corrosion potential of the core to become somewhat more noble than would be the case in conventionally processed sheet.

Fabrication Procedure

The core is cast by any suitable commercial casting process, with the direct chill method being preferred. The ingot formed is then scalped and this core alloy with the desired Al—Si alloy liner plates is preheated in the range 425°–525° C. and hot rolled to bond the plates to the core and to reduce the thickness to an acceptable value for subsequent cold rolling. For the best compromise between the requirements of hot rolling and the requirements of this invention, a temperature in the range of 475°–500° C. is preferred, with long soak periods at temperature being avoided. The idea is to keep the manganese in the core alloy as much as possible in solid solution or in very small precipitate particles which are small enough to be unstable when later exposed to temperatures of the order of 600° C.

The hot rolled stock is preferably cold rolled directly to final gauge without any interannealing. Thus, as stated above, it has been found that generally poorer corrosion results were obtained when some interanneal was provided in the cold rolling procedure. The amount of cold reduction can be as high as the alloy can stand without excessive edge cracking and cold reductions in the order of about 50° to 90% have been successful.

Before final heat treatment, the composite sheet is usually formed into the desired part. Cold rolled sheet has poor formability and it may be necessary to anneal or partially anneal to increase the formability of the material enough to enable the parts to be formed. Here again, the same principles apply: annealing temperatures and times should be kept at a minimum to avoid the formation of coarse Mn-containing precipitate particles. Full annealing is typically carried out at about 350°–425° C., while partial annealing is typically carried out at about 250°–350° C.

During annealing, the process of silicon diffusion from the coating into the core is initiated but the diffusion rate is very slow at temperatures of 425° C. and below. It is mostly during the final heat treatment, particularly in the temperature range of 550°–600° C. that rapid silicon diffusion takes place and causes most of the manganese in solid solution to precipitate and form a dense band. Additional diffusion occurs on slow cooling from heat treating temperature.

It is also possible to combine the anneal and the high temperature treatment provided sufficiently high heating and cooling rates are used to prevent precipitation growth. For instance, a rate of 30° C./min is suitable.

The following examples are offered for purposes of illustration only, and are intended neither to define nor limit the invention in any manner.

In the photomicrographs which illustrate a preferred embodiment of the invention:

EXAMPLE I

Figure 1:
FIG. 1 is a photomicrograph of a sample as brazed.

Eleven different alloys were prepared for testing and the compositions of these alloys are shown in Table I below:

TABLE 1

| Cast No. | Chemical Compositions in Weight Percent | | | | | |
|---|---|---|---|---|---|---|
| | Cu | Fe | Mg | Mn | Si | Ti |
| IRD | 0.31 | 0.19 | 0.27 | 1.11 | 0.05 | 0.008 |
| JBN | 0.31 | 0.60 | 0.31 | 1.11 | 0.08 | 0.014 |
| JBO | 0.30 | 0.17 | 0.31 | 1.10 | 0.13 | 0.014 |
| JBP | 0.30 | 0.17 | 0.30 | 1.09 | 0.21 | 0.014 |
| JBQ | 0.30 | 0.17 | 0.28 | 1.09 | 0.33 | 0.014 |
| JBR | 0.30 | 0.31 | 0.30 | 1.09 | 0.12 | 0.013 |
| JBS | 0.30 | 0.45 | 0.28 | 1.09 | 0.21 | 0.013 |
| JBT | 0.31 | 0.20 | 0.30 | 0.58 | 0.06 | 0.013 |
| JBU | 0.15 | 0.51 | 0.51 | 0.59 | 0.20 | 0.014 |
| JBV | <0.01 | 0.19 | 0.30 | 0.99 | 0.06 | 0.013 |
| JBW | 0.30 | 0.18 | <0.01 | 0.88 | 0.06 | 0.013 |

The alloy IRD was prepared according to the present invention using industrial ingot and the other samples were prepared in the laboratory. These alloys were cast in 3 ¾"×9" DC sheet ingot, scalped, clad with AA 4047 with 0.2% Mg, preheated to 500° C. and hot rolled to 0.1". After cold rolling to 0.015", sheet samples were partially annealed at 300° C. and, thereafter, submitted to a heat treatment at 500°-600° C.

The samples obtained were submitted to SWAT corrosion tests (ASTM G43) and were then examined metallographically to determine the influence of composition on the formation of a dense precipitate band in the core alloy just under the Al—Si coating. The results obtained are shown in Table 2 below:

TABLE 2
Effect of Composition on Dense Band Formation

| Alloy | Dense Precipitate Band | Band Rating* (1 best–10 worst) | Corrosion Rating** (1 best–5 worst) |
|---|---|---|---|
| IRD-.19 Fe | Thick and dense | 1 | 1 |
| JBO-.13 Si | Medium and light | 3 | 2 |
| JBP-.21 Si | Thin and faint | 5 | 4 |
| JBQ-.32 Si | Nearly non-existent | 10 | 5 |
| JBN-.60 Fe | Thick and light | 2 | 5 |
| JBR-.31 Fe JBR-.12 Si | Medium and faint | 5 | 3 |
| JBS-.45 Fe JBS-.21 Si | Thin and faint | 8 | 5 |
| JBT-.58 Mn | Thin and faint | 9 | 5 |
| JBU-.59 Mn (3005) | Thin and faint | 8 | 5 |
| JBV-No Cu | Medium and faint | 7 | 4 |
| JBW-No Mg | Medium and light | 4 | 3 |

*Rating based on band thickness (μm) and intensity.
**Corrosion rating based on results of two tests for 2, 3 and 4 weeks in SWAT.

The above results show that silicon is particularly critical to band formation, with no band being formed at 0.3% silicon. This clearly shows that a low silicon content is essential in order to obtain the results of the present invention. The iron content is also important and the results show that a low iron content is beneficial, with best results below 0.4% iron. It can be seen that lowering the manganese content is detrimental since the precipitate in the dense band is mostly made of manganese. Magnesium is not critical, but the presence of copper is important to form a strong and effective band.

EXAMPLE 2

The following experiment demonstrates how homogenization of the core alloy and interannealing affects the process of this invention.

An alloy was prepared containing 0.32% copper, 0.17% iron, 0.44% magnesium, 1.06% manganese, 0.05% silicon and 0.013% titanium. All percentages are by weight, with the balance being aluminum and incidental impurities. The alloy was either homogenized at 550° C. for 4 hours or simply preheated to 500° C. and hot rolled as described in Example 1. The alloy was clad with AA 4045 containing 0.2% magnesium and cold rolled to 0.050". Some samples obtained were interannealed and others were not, and all were cold rolled to 0.013" final gauge. After a final partial anneal, the coupons cut from the samples were submitted to a heat treatment at 550°-600° C. and exposed to SWAT corrosion tests.

The results are given in Table 3 below:

TABLE 3
Influence of Homogenization and Interannealing

| Preheat °C.-h | Interanneal °C.-h | Final Anneal °C.-h | Perforation (P) in SWAT after | | | |
|---|---|---|---|---|---|---|
| | | | 1 Week | 2 Weeks | 3 Weeks | 4 Weeks |
| 550-4 | No | 300-2 | 0 | P | P | P |
| 500-1 | No | 300-2 | 0 | 0 | 0 | 0 |
| 500-1 | 350-1 | 280-2 | 0 | 0 | P | P |

The above results clearly show that homogenization was detrimental.

EXAMPLE 3

This example demonstrates the role of the band of dense precipitate in corrosion resistance.

A core alloy was prepared containing 0.31% copper, 0.19% iron, 0.27% magnesium, 1.11% manganese, 0.05% silicon, 0.008% titanium, 0.01% zinc and the balance aluminum. This was cast and formed into a sheet by the same procedure as used in Example 1. It was clad on one side with AA 4045 and clad on the other side with AA 1070. The final sheet was 0.0125" thick and a 2"×6" sample was exposed to a final heat treatment while in a vertical position. Three coupons were punched out of the sheet and the AA 1070 side was glued to Bakelite mounts. One sample remained as treated while the other two were ground on 400 grit silicon carbide paper to expose the band of dense precipitate in one case and the main core alloy in the other case.

Figure 2:
FIG. 2 is a photomicrograph of a sample with the band of dense precipitate exposed.
Figure 3:
FIG. 3 is a photomicrograph of a sample with the main core alloy exposed.

The three mounts were placed in a SWAT cabinet and subjected to corrosive atmosphere for 48 hours. The three sheets were then separated from the Bakelite mounts and two sections from each were prepared for metallographic examination. The results are shown in FIGS. 1-3 in which the cladding is shown as A, the band of dense precipitate as B the main core alloy as C and the AA 1070 layer as D. These examinations showed that the band of dense precipitate B had a beneficial effect in delaying corrosion of the core material C. It also showed that once the clad A and the band layer B had been removed or corroded away, the main portion of the bare core C perforated in less than 48 hours. This performance was similar to standard core alloys such as AA 3005.

EXAMPLE 4

The following experiment was carried out to determine the characteristics of the band of dense precipitate.

A core alloy having the same composition as that of Example 3 was prepared in the same manner as described in Example 1. Samples of the alloy were examined before and after heat treatment. One examination was a TEM examination of matrix and constituents composition, in and out of the band of dense precipitates. It was found that before heat treatment, the Mn-containing precipitate particles (often called dispersoids) were small and numerous with sizes in the order of 0.03 to 0.1 μm. During the brazing cycle, outside the band the smaller dispersoids dissolved and a few larger ones coarsened to a size of about 0.1 to 0.4 μm. In the band of dense precipitate, however, the small constituent particles were found to be still numerous; there was some coarsening but many small particles survived the heat treatment temperatures with sizes in the range of 0.03 to 0.2 μm.

Energy dispersing analysis by X-ray (EDAX) of matrix and particles, before and after heat treatment, revealed significant variations. The average results are given in Table 4 below.

TABLE 4

| | Average Analysis of Core Matrix and Constituents | | | | | | | |
|---|---|---|---|---|---|---|---|---|
| | Matrix | | | | Precipitate Particles | | | |
| Condition | No. of Readings | Al % | Mn % | Si % | No. of Readings | Al % | Mn % | Si % |
| Core before heat treatment | 3 | 99.5 | 0.5 | — | 3 | 88.8 | 10.1 | 1.0 |
| Core out of band After heat treatment | 2 | 99.3 | 0.6 | 0.02 | 2 | 82.3 | 17.6 | 0.1 |
| In band After heat treatment | 2 | 98.7 | 0.1 | 1.2 | 4 | 78.8 | 14.4 | 6.8 |

The above table shows that the manganese content in the matrix, well inside the core, was increased slightly by the heat treatment but reduced markedly in the band of dense precipitate. At the same time, the silicon content which was very low away from the band was at the 1.2% level in the band. This silicon in the band diffused in from the Al—Si layer.

The precipitate particles before heat treatment contained Al, Mn and Si, but after heat treatment, the particles away from the band were coarsened by further manganese precipitation and contained mostly Al and Mn. In the band, after heat treatment, the particles had a higher average silicon content than in the original particles.

It appears that during the heat treatment, there is formation of a Si-rich layer, just under the Al—Si layer, and the high silicon content reduces drastically the solid solubility of manganese in the core alloy. Well inside the core, the silicon is low and manganese remains fairly soluble, so that the fine, unstable dispersoids dissolve and some manganese precipitates on the coarser surviving particles. In the heat treated product, there is substantially less manganese in solid solution in the band than in the alloy outside the band, with the alloy outside the band preferably containing at least 0.3% manganese in solid solution.

It should be understood that the above description is merely illustrative of this invention and that many changes and modifications may be made by those skilled in the art without departing from the scope of the appended claims.

I claim:

1. A corrosion resistant aluminum article comprising a main body portion formed of an aluminum alloy containing no more than 0.4% iron, no more than 0.15% silicon, from about 0.1% to about 0.5% copper and from about 0.7% to about 1.5% manganese,
   wherein a silicon-rich band of dense precipitate is formed in the alloy adjacent at least one face thereof, said band having a thickness of about 20–50 μm, and containing substantially less manganese in solid solution than in the alloy outside the band, the silicon in the silicon-rich band having migrated under heat treatment from a layer of silicon containing material on said main body portion.

2. An aluminum article according to claim 1, wherein the alloy outside the band contains at least 0.3% manganese in solid solution.

3. An aluminum article according to claim 1 wherein the main body alloy contains up to 0.8% magnesium.

4. An aluminum article according to claim 1 wherein the main body alloy contains about 0.05% to about 0.25% zirconium.

5. An aluminum article according to claim 1, wherein the main body alloy comprises no more than 0.2% iron, no more than 0.1% silicon, from about 0.2% to about 0.4% copper, from about 0.2% to about 0.4% magnesium and from about 0.9% to about 1.1% manganese.

6. An aluminum article according to claim 5, wherein the main body alloy also contains from about 0.1% to about 0.15% zirconium.

7. An aluminum alloy composite material for use in producing a corrosion resistant aluminum article by heat treatment comprising:
   (a) a main body portion formed of an aluminum alloy containing no more than 0.4% iron, no more than 0.15% silicon, from about 0.1% to about 0.6% copper and from about 0.7% to about 1.5% manganese, and (b) a silicon-containing layer on at least one side of said main body portion,
   wherein the manganese in the main body portion is substantially in solid solution and/or in the form of a fine, uniformly distributed precipitate of manganese-containing particles having sizes of less than 0.2 μm.

8. A process for producing a corrosion resistant aluminum product which comprises forming a product from an aluminum alloy containing no more than 0.4% iron, no more than 0.15% silicon, from about 0.1% to about 0.6 copper and from about 0.7% to about 1.5% manganese, applying to the surface of said product a silicon-containing layer to form a composite product, said product being formed without substantial homogenization or interannealing, and heat treating the obtained composite product, whereby a silicon-rich band of dense precipitate is formed in the alloy adjacent the silicon-containing layer, said band having thickness of about 20–50 μm and containing substantially less manganese in solid solution than in the alloy outside the band.

9. A process according to claim 8 wherein the heat treatment is carried out at a temperature of at least 550° C.

* * * * *